Dec. 8, 1931. I. C. JENNINGS Re. 18,275

STEAM TURBINE DRIVEN VACUUM HEATING APPARATUS

Original Filed March 13, 1925 3 Sheets-Sheet 1

Inventor

Irving C. Jennings.

By Southgate Fay & Hanley

Attorneys

STEAM TURBINE DRIVEN VACUUM HEATING APPARATUS
Original Filed March 13, 1925 3 Sheets-Sheet 2
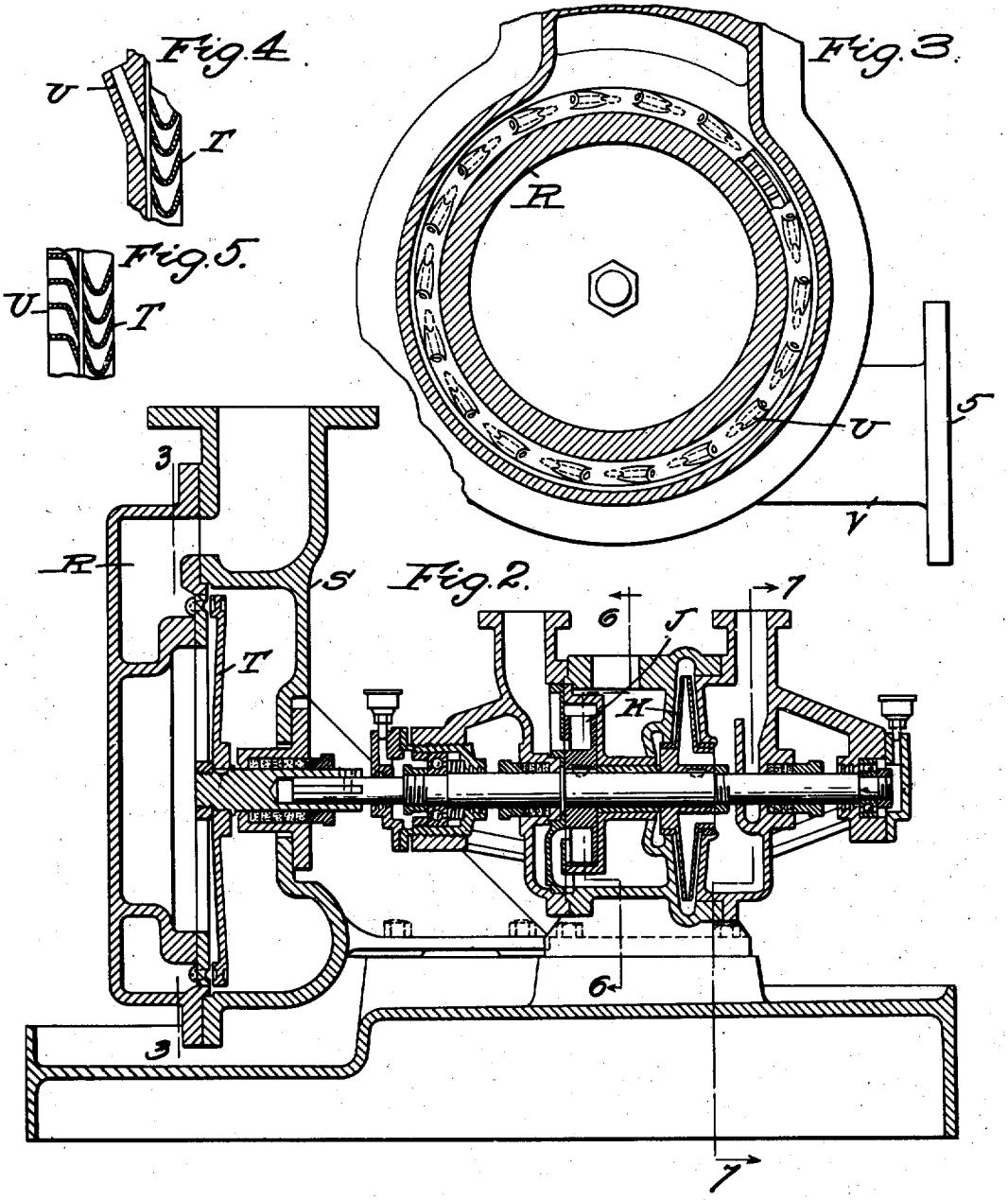
Inventor
Irving C. Jennings.
By Sandlyte Fay & Hanley
Attorneys Dec. 8, 1931. I. C. JENNINGS Re. 18,275
STEAM TURBINE DRIVEN VACUUM HEATING APPARATUS
Original Filed March 13, 1925 3 Sheets-Sheet 3
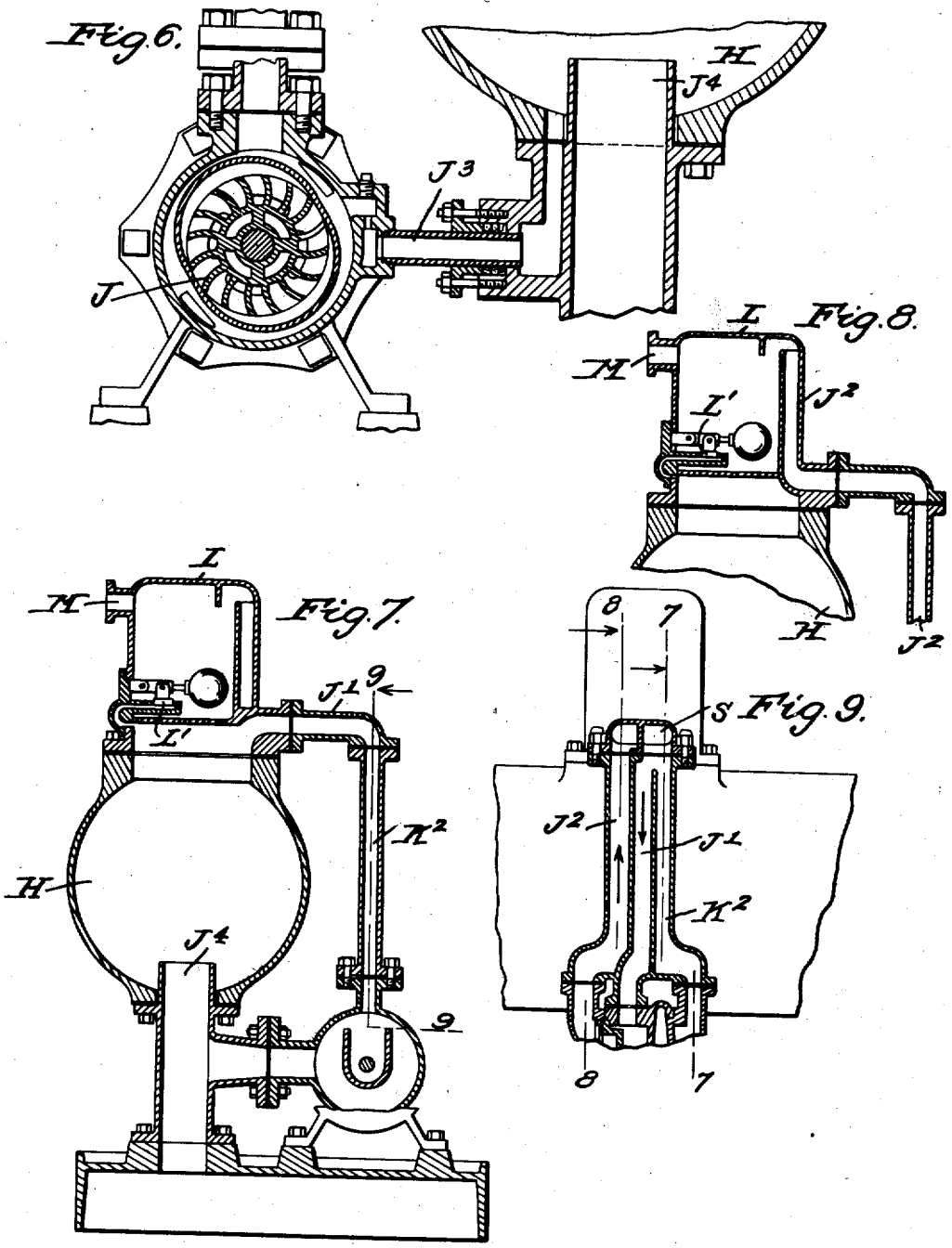
Inventor
Irving C. Jennings
By Sandlyate Fay & Hanley
Attorneys Reissued Dec. 8, 1931

Re. 18,275

UNITED STATES PATENT OFFICE

IRVING C. JENNINGS, OF SOUTH NORWALK, CONNECTICUT, ASSIGNOR TO NASH ENGINEERING COMPANY, OF SOUTH NORWALK, CONNECTICUT, A CORPORATION OF CONNECTICUT

STEAM TURBINE DRIVEN VACUUM HEATING APPARATUS

Original No. 1,722,847, dated July 30, 1929, Serial No. 15,415, filed March 13, 1925. Application for reissue filed September 8, 1931. Serial No. 561,790.

The object of this invention is to provide new and improved combinations, by which the wet pumping apparatus used in vacuum steam heating can be driven by a steam turbine.

The pumping apparatus now used in vacuum steam heating comprises a hydro-turbine pump for creating and maintaining a vacuum in the returns of the steam heating system and a centrifugal pump for returning the water of condensation to the boiler.

An apparatus of this kind is shown in Reissue Patent No. 15,637, granted to me June 26, 1923, for wet vacuum pumping apparatus. Pumping apparatuses of this kind have usually been driven by an electric motor, which is continuously driven, or which is controlled automatically. This kind of pumping apparatus has also been driven by a high pressure steam turbine.

As one of the advantages of vacuum steam heating is the use of a low boiler pressure, the use of a high pressure steam turbine to drive the pumping apparatus is not feasible unless a source of high pressure steam is also available, which is not usually the case.

It has heretofore not been found practical to use a steam turbine to drive the pumping apparatus with low pressure steam, because a steam turbine will not work satisfactorily with steam pressures much below fifteen pounds.

Attempts have been made to use reciprocating steam engines in this location with large steam ends at ten pounds pressure, but it has been found that even with very large pistons their operation was uncertain.

I have adapted a steam turbine to this particular service, by arranging the same to have a great many entrance jets, by passing a large volume of low pressure steam through the same, and by using the steam driving the turbine in the heating system. I also automatically maintain a constant differential of pressure between the inlet and outlet of the turbine by admitting just the extra steam needed into the system.

The steam turbine will not require as much steam to operate it as will be required for the heating system. I use this fact to control the turbine by supplying the same with low pressure steam necessary for its operation, by using the steam passing from the turbine in the heating system, and by allowing the additional steam required for heating to pass to the system through a pressure controlling valve which may be automatically operated.

It is necessary in a vacuum steam heating system to have the pump always ready to operate. If the steam turbine was simply included in the line to the radiating system, the boiler pressure might be balanced in the returns, which would cause the turbine to stop and become inoperative.

By the connections and arrangements I will hereinafter describe, the turbine will always be ready to operate.

The invention will be best understood by describing a particular embodiment thereof.

Referring to the accompanying three sheets of drawings forming part of this application for patent, Figure 1 is an elevation illustrating one embodiment of my improved combination;

Fig. 2 is a sectional elevation on an enlarged scale illustrating the pumping apparatus and connected steam turbine;

Fig. 3 is a sectional view on the line 3—3 of Fig. 2 illustrating the plurality of nozzles for supplying a great number of jets of steam to operate the turbine;

Fig. 4 is a sectional view illustrating the steam nozzles;

Fig. 5 is a similar view illustrating a modification of the nozzles;

Fig. 6 is a cross sectional elevation on the line 6—6 of Fig. 2 illustrating the hydro-turbine pump and the connection which supplies the same with make-up water;

Fig. 7 is a cross sectional elevation on the line 7—7 of Figs. 2 and 9, illustrating connections to the casing of the centrifugal water pump and air pump;

Fig. 8 is a partial cross sectional view similar to Fig. 7, taken on the line 8—8 of Fig. 9, and Fig. 9 is a sectional elevation taken on the line 9—9 of Fig. 7 through the manifold connecting the pumping apparatus with the separating tank and separator.

Figure 1:
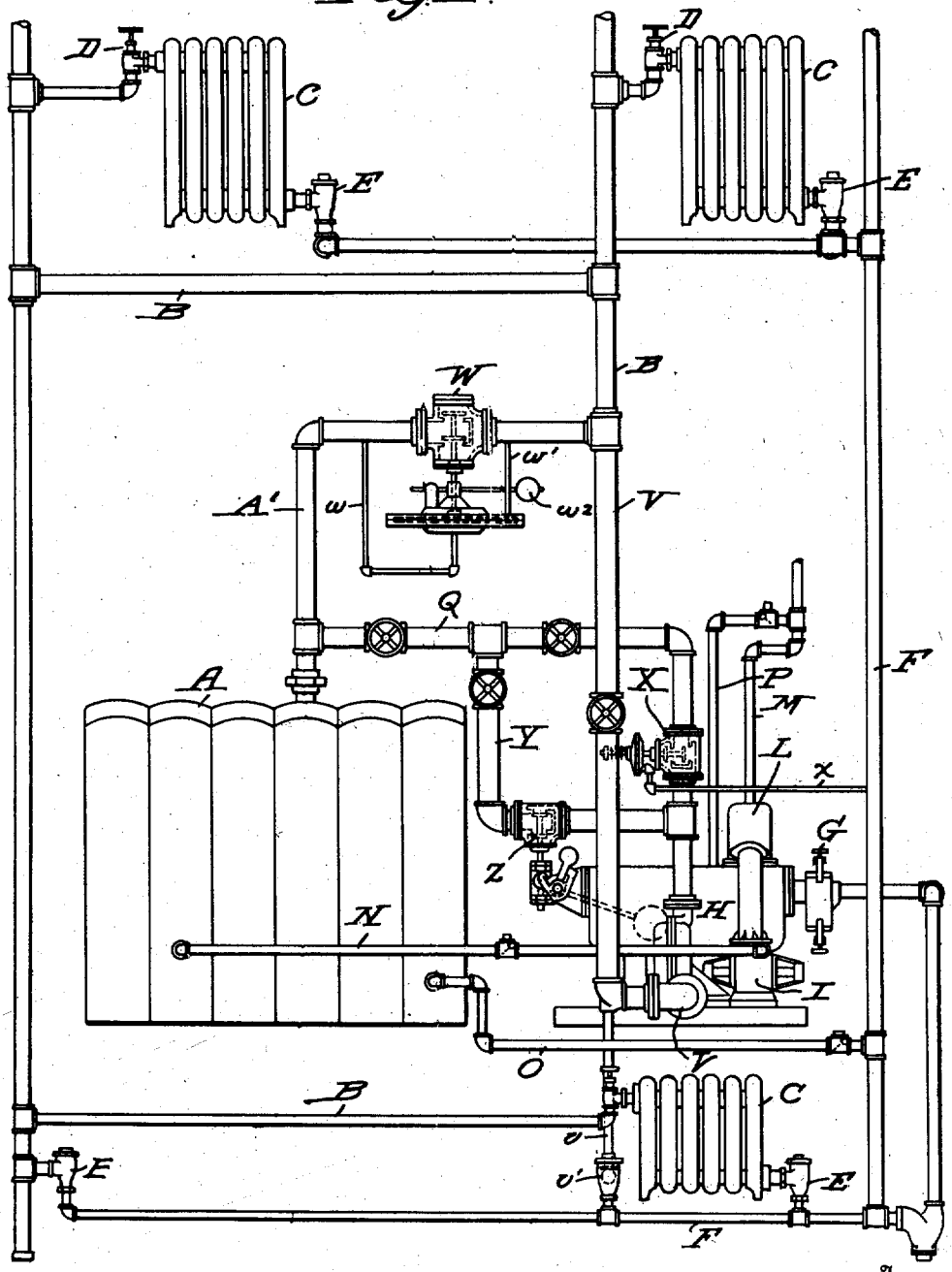

Referring to the drawings and in detail, A designates a low pressure steam generator or boiler. Low pressure steam is led therefrom through a feed pipe A′ and a pipe-line B to supply the radiators or other heat distributing means C with low pressure steam. The radiators may be arranged above and below the boiler level as illustrated. The radiators C are provided with the usual steam entrance controlling valves D and with the usual traps E on their exit ends. The returns from the radiators pass into a return line F, which is connected through a screen G with a separating tank H. I designates the pumping apparatus. The same comprises a hydro-turbine air pump J, and a centrifugal water pump K.

The hydro-turbine pump J uses water for its pumping action and is connected by pipe J′ to exhaust the air and gases from the top of the separating tank H and to deliver the same through pipe $J^2$ through a separator L out through an air escape pipe M. The function of the separator L is to allow any water passing out through the discharge of the hydro-turbine pump J to return into the separating tank H, by means of a float controlled valve L′ arranged as illustrated in Figs. 7 and 8.

The centrifugal water pump K takes the water of condensation from the bottom of the separating tank H and returns the same through a pipe N having a check valve to the boiler A.

A by-pass pipe O, having a check valve is usually arranged between the return line F and the boiler to permit some of the water in the system to return to the boiler, by gravity, in case the pumping apparatus is shut down.

A vent pipe P having an outwardly opening check valve may be arranged between the top of the separating tank H and the air escape pipe M to allow air to escape from the system when the pumping apparatus is first started in operation rather than to wait for the pump to exhaust it.

The hydro-turbine air pump J is kept supplied with the water necessary for its operation by a connection $J^3$ to the separating tank H arranged at a lower level than the connection $J^4$ to the centrifugal pump, or by using the water in the returns, and the inlet side of the centrifugal pump K may be connected to the top of the separating tank by a connection $K^2$ as shown in Fig. 7 so that it will not become air bound.

As thus far described, the apparatus comprises a low pressure vacuum steam heating system in which a vacuum will be maintained in the return line and any air or gases therein will be delivered out of the system, and by which the water of condensation will be returned to the boiler. The detail operation of this apparatus is described in my said patent. Any other wet vacuum pumping apparatus may be employed.

In the usual practice, the heating system is supplied with low pressure steam say of four or five pounds, and perhaps ten inches of mercury, or five pounds of partial vacuum is maintained in the return line, and the pumping apparatus is driven by an electric motor or by high pressure steam operating a turbine.

A steam turbine cannot be driven satisfactorily by this low pressure steam, as previously pointed out.

I will now describe the principal feature of my invention which consists in arranging the connections to the heating apparatus and the steam turbine to operate efficiently with this low pressure steam.

A branch steam supply pipe Q is led from the steam feed pipe A′ to an inlet chamber R formed in the casing S in which the turbine T rotates. Any form of steam turbine may be used and I have illustrated one form of the well known Curtis turbine.

The steam is permitted to pass from the inlet chamber R to drive the turbine through a large number of jets U arranged in a circle parallel with the blades or buckets of the turbine T. These supply jets may be nozzles as illustrated in Figure 4 or may be angled passages, as illustrated in Figure 5.

By this arrangement, a large volume of low pressure steam will be directed on the blades of the turbine T and the same can be used to devolop the necessary power, although low pressure steam is used.

The exhaust from the turbine is led through a pipe V into the supply pipe B which leads the steam to the radiators.

To obtain the necessary differential of pressure between the steam passing through the pipe Q to the steam turbine and the exhaust therefrom through the pipe V, I employ an automatic pressure regulating valve W between pipes A′ and B. This automatic differential controlling vavle W is employed to maintain a constant differential of pressure between the boiler pressure and the heating system of, say, six inches of mercury, or three pounds.

Inasmuch as the turbine will not supply sufficient steam for the heating system, this valve W will control and automatically maintain the differential of pressure required to operate the turbine, by additionally admitting just the right amount of steam into pipe B.

The automatic differential valve W, which is preferably employed is of a balanced type, the pressure of the boiler being led against the diaphragm on the under side thereof through a pipe *w*, and the pressure on the supply to the heating system being led to the upper side of the diaphragm, through the pipe *w′*. The valve W is provided with an adjustable weight $w^2$, the setting of which determines the difference in pressure.

By maintaining this difference of pressure automatically and by using a large quantity of low pressure of steam to operate the turbine, the apparatus is self-operating, that is, neither an electric motor nor high pressure steam is required.

The differential valve W also will perform the function of the centrifugal governor usually employed to control the speed of the turbine, because, as a constant differential is maintained at all times, the turbine will operate substantially at a constant speed.

The advantages of operating a steam heating system without using high pressure steam or without electrical devices are apparent.

The heat in the building is controlled by firing the boiler more or less as required to raise or lower the steam pressure. The dampers of the boiler may be automatically controlled by a thermostatic apparatus, if desired, so that a predetermined even temperature of the premises to be heated can be maintained.

If a greater pressure is generated in the boiler, as the differential between the steam supply and the pipe B remains constant, the pressure in the pipe B will be raised corresponding to the increase of the boiler pressure, and thus higher pressure steam will pass to the heating system.

If the boiler pressure is lowered, the opposite effect will take place. In other words, with a higher boiler pressure, the differential will not be changed but the pressure on the system will be increased. With a lower pressure on the boiler, the heating system will be supplied with lower pressure steam but the differential will not be changed. The turbine will be driven at the same speed whether the boiler pressure is raised or lowered as its operating differential of pressure remains constant.

The operation of the pumping apparatus can be controlled automatically, if desired, by an automatic shut-off valve X arranged in the pipe Q and operated by a diaphragm exposed to the vacuum in the return line F, by branch pipe $x$.

The operation of the apparatus also can be controlled by the height of water in the separating tank H, by means of a branch line Y extending around the shut-off X and containing a shut-off valve Z operated by means of a float in the separating tank through a lost motion connection.

By means of these instrumentalities when the water rises in the separating tank and should be pumped back to the boiler, steam is supplied to the turbine through valve Z, and when the vacuum falls in the return line F and the hydro-turbine air pump should work, steam is supplied to the turbine through valve X.

When the proper vacuum is obtained in the return line and when there is no water in the separating tank H which should be pumped back to the boiler, the supply of steam to the turbine is shut off as both valves X and Z will then close.

The automatic differential controlling valve W will take care of all conditions and will regulate the supply of steam so that a differential will be constantly maintained between the inlet to and outlet from the steam turbine.

The steam turbine is thus always ready to operate if either valve X or Z is opened.

The turbine casing S is connected by a pipe $v$ having a thermostatic or float trap $v'$ to the return line F, to allow any water collecting in the casing, which might tend to water log the turbine, to escape.

I have not shown the construction of the various valves, pumps and connections in detail, as the instrumentalities employed are well known per se and many forms thereof can be used.

My invention resides in particular in the new combinations and arrangements by which the desirable results before particularized are obtained.

The details and arrangements herein shown and described may be greatly varied by a skilled mechanic without departing from the scope of my invention as expressed in the claims.

Having thus fully described my invention, what I desire to claim and cover by Letters Patent, is:

1. The combination in a vacuum steam heating system, including a generator and heat distributing means, of a wet vacuum pumping apparatus, a turbine arranged for operation on low pressure steam for driving the same, and connections whereby steam is supplied to the turbine from the supply of steam for said heat distributing means and exhausted from said turbine into the heat distributing means.

2. The combination in a vacuum steam heating system including a generator, and heat distributing means, of a wet vacuum pumping apparatus, a turbine arranged for operation on low pressure steam for driving the same, connections whereby steam is supplied to the turbine from the generator and exhausted from the turbine into the heat distributing means, and a connection between the generator and the heat distributing means for allowing additional steam to pass directly into the heat distributing means without going through the turbine.

3. The combination in a vacuum steam heating system including a generator and heat distributing means, of a wet vacuum pumping apparatus, a turbine for driving the same, connections whereby steam is supplied to the turbine from the generator and exhausted from the turbine into the heat distributing means, a connection between the generator and the heat distributing means for allowing additional steam to pass directly into the heat distributing means without going through the turbine, and a regulating valve in this connection.

4. The combination in a vacuum steam heating system including a generator and heat distributing means, of a wet vacuum pumping apparatus, a turbine for driving the same, connections whereby steam is supplied to the turbine from the generator and exhausted from the turbine into the heat distributing means, and a pressure controlling valve arranged between the steam supply and the heat distributing means to maintain a constant differential of steam pressure therebetween.

5. The combination in a vacuum steam heating system including a generator and heat distributing means, of a wet vacuum pumping apparatus, a turbine for driving the same, connections whereby steam is supplied to the turbine from the generator and exhausted from the turbine into the heat distributing means, and an automatically operating pressure controlling valve arranged between the steam supply and the heat distributing means to maintain a constant differential of steam pressure therebetween, whereby a constant differential of steam pressure will be maintained between the inlet to and the outlet from the turbine.

6. The combination in a vacuum steam heating system of a low pressure steam boiler and heat distributing means, a wet vacuum pumping apparatus, a turbine for driving the same, a connection from the boiler to the turbine, a connection from the turbine to the supply to the heat distributing means, a connection from the boiler to the heat distributing means, and an automatic pressure controlling valve arranged in this last named connection for maintaining a constant differential of steam pressure between the inlet to and the outlet from the turbine.

7. The combination in a vacuum steam heating system including a generator and heat distributing means, of a wet vacuum pumping apparatus, a turbine for driving the same, a connection between the generator and the turbine, said turbine having a large number of operating jets, whereby same can be driven by low pressure steam from the generator, and a connection whereby steam is exhausted from the turbine into the heat distributing means.

8. The combination in a vacuum steam heating system including a generator and heat distributing means, of a wet vacuum pumping apparatus, a turbine for driving the same, a connection between the generator and the turbine, said turbine having a large number of operating jets whereby same can be driven by low pressure steam from the generator, a connection whereby steam is exhausted from the turbine into the heat distributing means, and an automatic pressure controlling valve arranged between the steam supply and the heat distributing means to maintain a constant differential of steam pressure therebetween.

9. The combination in a vacuum steam heating system including a generator and heat distributing means, of a wet vacuum pumping apparatus, a turbine for driving the same, connections whereby steam is supplied to the turbine from the generator and exhausted from the turbine into the heat distributing means, and an adjustable pressure controlling valve arranged between the steam supply and the heat distributing means to maintain a constant differential of steam pressure therebetween.

10. The combination in a vacuum steam heating system including a generator and heat distributing means, of a wet vacuum pumping apparatus, a turbine for driving the same, connections whereby steam is supplied to the turbine from the generator and exhausted from the turbine into the heat distributing means, and a pressure controlling valve arranged between the steam supply and the heat distributing means and having a diaphragm for operating the same, the diaphragm being exposed on one side to pressure in the steam supply extending from the generator and on the other side to the pressure in the connection extending to the heat distributing means.

11. The combination in a steam heating system, of a wet vacuum pumping apparatus comprising a separating tank, a centrifugal water pump and a hydro-turbine air pump, a turbine for driving the pumps, heat distributing means, a branched connection whereby steam is admitted to the turbine and a connection whereby steam is exhausted therefrom into the heat distributing means; and valves in the branches for controlling the inlet of steam to the turbine operated respectively by the vacuum in the heat distributing means and by the level of the water in the separating tank.

12. The combination stated in claim 11, in which the valve for controlling the inlet of steam to the turbine by the level of the water in the separating tank is operated by a float and a lost motion connection.

13. The combination in a heating system of a wet vacuum pumping apparatus, comprising a separating tank, a centrifugal water pump and a hydro-turbine air pump, a turbine for driving the pumps, heat distributing means and connections whereby steam is admitted to the turbine and exhausted therefrom into the heat distributing means, valves for controlling the inlet of steam to the turbine operated by the vacuum in the heat distributing means and by the level of the water in the separating tank, and an automatic pressure controlling valve arranged between the steam supply and the heat distributing means to maintain a constant differential of steam pressure between the inlet to and the outlet from the turbine.

In testimony whereof I have hereunto affixed my signature.

IRVING C. JENNINGS.